INVENTORS
HAROLD E. JONES
FRIEDRICH A. KARNER
ERNEST H. MILLHAM
BY John C Black
ATTORNEY Jan. 27, 1970

H. E. JONES ET AL 3,492,572

PROGRAMMABLE ELECTRONIC CIRCUIT TESTING
APPARATUS HAVING PLURAL MULTI-FUNCTION
TEST CONDITION GENERATING CIRCUITS

Filed Oct. 10, 1966

United States Patent Office 3,492,572
Patented Jan. 27, 1970

3,492,572
PROGRAMMABLE ELECTRONIC CIRCUIT TESTING APPARATUS HAVING PLURAL MULTI-FUNCTION TEST CONDITION GENERATING CIRCUITS
Harold E. Jones, Endicott, and Friedrich A. Karner and Ernest H. Millham, Apalachin, N.Y., assignors to International Business Machines Corporation, Armonk, N.Y., a corporation of New York
Filed Oct. 10, 1966, Ser. No. 585,547
Int. Cl. G01r 15/12
U.S. Cl. 324—73                                                11 Claims

ABSTRACT OF THE DISCLOSURE

In apparatus for testing electronic circuit cards, a plurality of similar circuits are provided, one for each circuit card contact, each circuit is programmed to apply to a specific contact of the card under test a selected one of a plurality of conditions, e.g. a positive or negative driver input, a positive or negative load, a positive or negative power supply potential, ground potential or an open circuit condition.

---

A tunnel diode latch, which will be described below, is the subject matter of copending United States patent application of Friedrich A. Karner, one of the inventors herein, assigned to the same assignee, entitled "Floating Tunnel Diode Hybrid Latch," Ser. No. 585,539, filed Oct. 10, 1966. Said copending application is hereby incorporated in the present application as if it were set forth in its entirety.

In recent years, semiconductor logic circuits have been frequently packaged on plug-in cards, irrespective of the semiconductor fabrication techniques employed. This is particularly true in the data processing industry. Input drive leads, power supply leads, output leads and the like are brought out to contacts on an edge of the card.

The automatic or semi-automatic testing of circuits mounted on boards in this fashion has become common in recent years. However, in known test apparatus of this type, each terminal in the test apparatus, which is adapted to receive a specific terminal of the card under test, has been connected to selected bias and signal generating sources by way of manually changeable plugboards or automatic switching means. So far as is known, the bias and signal generating sources performed only a single function. Each type card necessarily required its own respective plugboard (or switching mechanism) for connecting its contacts to the suitable drivers, loads, supply levels and the like. In addition, known earlier equipment required different drivers for different types of circuit families and occasionally different drivers for testing the same circuit family. As the circuit density of the cards increased, the required number of card contacts increased. All of this has led to complex apparatus. As we move toward more fully integrated circuit fabrication, it appears that the contact requirements will increase even further.

It is therefore the primary object of the present invention to provide in test apparatus a very flexible and accurate, yet relatively simple circuit means for applying various input signal, load and reference supply conditions to circuits under test.

It is a more specific object of the persent invention to provide a single circuit type which is programmable, for example under computer control, to apply to each respective card contact, any selected one of the various conditions which are applied to any and all types of cards being tested. One of these circuits is then provided for each card contact.

Another object of the persent invention is the provision of a versatile test circuit which is programmable to provide a test condition at any one of a plurality of levels.

In some of the earlier systems referred to above, the use of each circuit to produce a relatively limited and inflexible test condition necessitated the use of a large number of such circuits. Thus the condition-producing circuits occupied considerable space.

The problems associated with selectively connecting respective ones of such circuits to a card being tested becomes necessarily complex, requiring switching arrays, plugboard arrangements or a combination of both. In those instances where it was desired to make the system more automatic, it was necessary to include within the apparatus a suitable switching array, giving rise to the need for a large amount of storage space.

However, this gave rise to another problem, e.g. in most instances, it is desirable, if not necessary, to locate the circuits which produce the conditions almost immediately adjacent the circuit card being tested. Otherwise, the connections between the condition-producing circuits and the cards under test become excessively long. Applying power supplies, drive signals and loads via long lines gives rise to serious reliability problems, particularly in high speed environments. At high speed operation, these long lines exhibit some of the environmental problems associated with transmission lines.

If the switching equipment between the circuits producing the conditions and the card being tested requires a large amount of space, it becomes physically impossible to locate the condition-producing circuits in close proximity to the card. To locate the condition-producing circuits closer to the cards, manually replaceable plugboards were frequently used, one plugboard for each type card.

The physical size of the power supplies for the condition-producing circuits adds further to the problem of producing the test signals immediately adjacent the card under test.

With a multi-function test-condition-producing circuit of the type proposed in the present application, the need for bulky plugboard and switching arrangements is obviated. A single test receptacle is provided for receiving all types of cards for testing. Each one of the condition-producing circuits is associated with one respective receptacle terminal and is selectively connected to said terminal by relative simple switch means. Positioning the condition-producing circuits close to the card under test is now limited only by the physical size of the condition-producing circuits.

These objects are achieved in a preferred embodiment of the invention by providing a plurality of similar electronic circuits, each of which is selectively controllable to produce any one of the following circuit functions: driver, load, power supply, ground and open circuit.

Each of the electronic circuits includes a pair of power supply circuits. Each supply can produce at its output a positive or negative voltage level. However, the output of one of the power supplies is never programmed to be more positive than the output of the other supply. Either of these supplies can be programmed to have discrete output levels between plus or minus twelve volts, and the outputs can be selectively applied by way of relay contacts to a test receptacle terminal. Each supply is capable of supplying current (within defined limits) to or accepting current from a card under test, irrespective of the polarity of its output voltage. One supply is identified as a "positive supply" because it is capable of supplying to the card under test a higher current than it can accept. Similarly, the other "negative supply" can accept current at a level higher than it can supply current.

The power supply outputs are also connected to the inputs of a pair of emitter follower current amplifiers by way of a voltage switch including a floating tunnel diode latch. The current amplifier outputs are then selectively connectable by relay contacts to the test receptacle terminal.

Associated with each of the current amplifiers is a respective current generator which is programmable to its on or off state. The level and polarity of the current generator is also programmable. The output voltage levels of the current amplifiers are determined by programming the power supply output levels. The tunnel diode latch is operated to apply the output of one of the power supplies and then the output of the other power supply to the current amplifiers to produce up and down input signal levels to the circuit under test. In this programmed condition, the circuit acts as a driver, positive or negative, depending upon which current amplifier and current generator is selected for use.

These circuits which act as positive and negative drivers, are similarly programmed to act as positive and negative load circuits for the card under test. However, when a current generator-current amplifier is used as a load circuit, the effective current amplifier is programmed so as to limit the voltage developed at the receptacle terminal to a selected maximum or minimum value. The effective current generator is programmed to act as a constant current source or drain; and a diode is interposed between the card under test and the load to prevent current of opposite polarity. The current amplifier is programmed so that the diode is forward biased or reverse biased, depending upon the logical state of the output of the card under test.

The terms "driver" and "load" as well as the terms positive and negative driver and positive and negative load should be clarified at this point. Generally speaking, the improved circuit acts as a driver when it is connected as a source of logical input signals to the card under test; and, conversely, when the improved circuit is connected to the output of the card under test to provide a current source or drain, it acts as a load. A driver must be capable of applying a constant voltage level to the card under test with substantial current of predetermined polarity; and it must be further capable of removing a programmed current level of the opposite polarity. A load on the other hand, will produce a constant current of one prescribed polarity only, when connected to the card under test. With this load condition existing, the programmed voltage level at the current amplifier output becomes a compliance voltage which restricts the maximum or minimum voltage level which the card under test can develop.

For purposes of definition in this application, it will be assumed that conventional current flow is referred to, that is, current flows from a more positive voltage level to a less positive level. Typically, a positive driver will, therefore, at an upper input voltage level thereto, cause current flow into the card under test and, in response to a lower input voltage level thereto, will cause a programmed level of current flow from the card under test into the driver.

Typically, the negative driver will cause current flow from the card under test into the driver when the driver input is at its lower value; and alternatively, when the input level to the negative driver is at its most positive level, a programmed value of current will be supplied from the driver to the circuit under test.

A positive load is a programmed value of current from the card under test to the load. A negative load is a programmed value of current from the load to the card.

In the preferred embodiment, the universal circuit applies ground potential or an open circuit condition to the card under test by relay-controlled contacts. Consequently, there is no need for interaction of the improved circuits to produce a ground or open circuit condition.

The emitter follower current amplifiers must be operable over a wide range of input signals; for example, from minus twelve volts to plus twelve volts. In addition, these amplifiers must at times be switched from one input level to another input level at very high speeds, for example, with ten nanosecond transient times. If a constant voltage supply were provided for the collectors of the emitter followers, the power dissipation within the emitter followers would vary widely with varying input voltage levels. Under those conditions in which the base-to-collector voltage is relatively high and the driver output current requirements relatively high, excessive power dissipation occurs. This excessive power dissipation would require the use of higher power transistors. The transistors which can accommodate higher power levels typically are relatively slow in their speed of operation, unless extremely expensive devices are used. To avoid excessive costs, emitter follower current amplifiers are utilized which include collector power supplies which are varied as a function of the input voltage level to minimize base-to-collector voltage differences.

As indicated above, the positive and negative supplies are selectively coupled to the current amplifiers of the positive and negative drivers by a tunnel diode latch. The output voltage of each supply can be programmed between plus and minus twelve volts. In the preferred embodiment, the difference between the output levels of the supplies can vary between approximately five-tenths volt and fifteen volts. These output levels form the supply voltages for the latch. Hence, the latch must be designed to operate with a widely varying "floating" supply; it must operate reliably and equally well with an extremely small supply voltage and with a relatively large supply voltage; it must have short switching transients, e.g. ten nanoseconds; and it must exhibit relatively constant, minimum voltage drops from input to output.

Accordingly, it is another object of the present invention to provide in test apparatus an improved drive circuit characterized by means for producing program-controlled, positive and negative power supply voltages and for selectively coupling the supply voltages to at least one current amplifier by means of an improved semiconductor latch with short switching transients.

It is another object of the present invention to provide in test apparatus an improved regulated power supply means for producing a predetermined voltage at an output terminal which is remote from both the power supply means and the voltage regulating means.

It is another object of the present invention to provide an improved power supply means of the type described in the preceding object which has extremely rapid recovery time when the output voltage drops incident to the application of a high load current.

The foregoing and other objects, features and advantages of the invention will be apparent from the following more particular description of a preferred embodiment of the invention, as illustrated in the accompanying drawings.

In the drawings:

FIGS. 1a and 1b are arranged;

FIG. 6 illustrates the manner in which FIGS. 5a and 5b are arranged; and

Figure 1A:
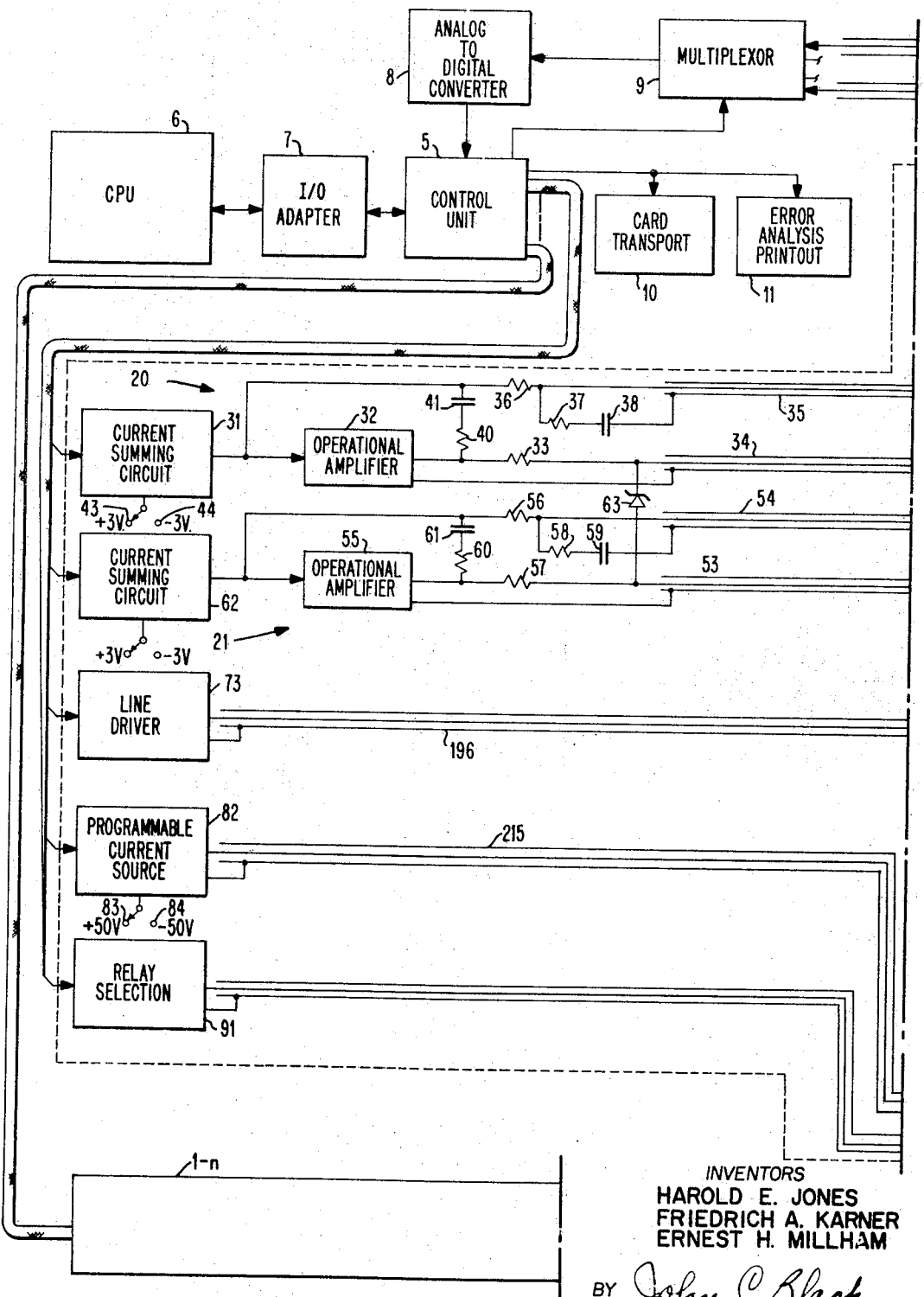
FIGS. 1a and 1b are a fragmentary diagrammatic illustration of automatic test apparatus incorporating the improved power supply, driver and load circuit of the present invention.
Figure 1B:
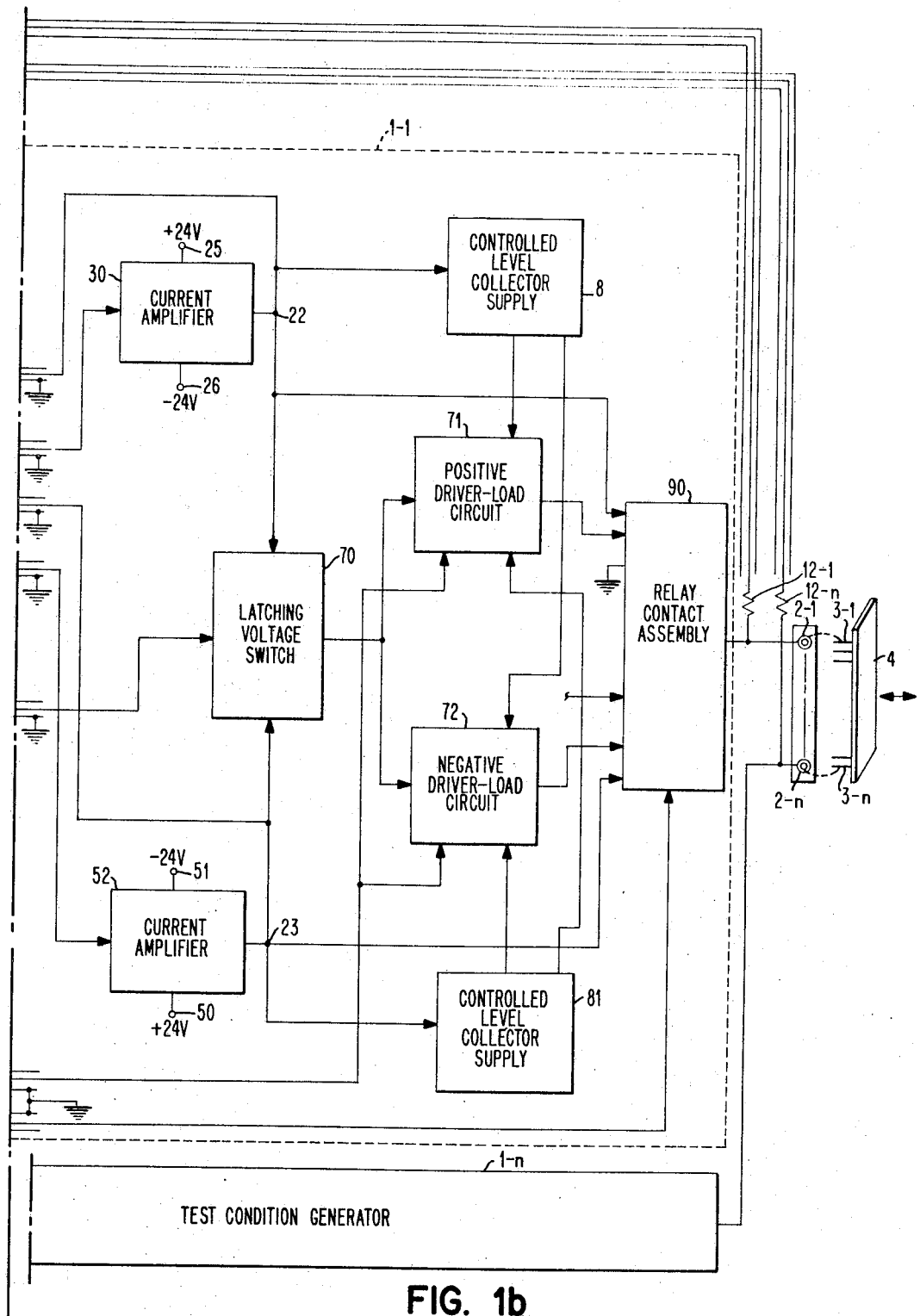

With particular reference to FIGS. 1a and 1b, the preferred embodiment of the improved test apparatus comprises a plurality of test condition generators 1–1 to 1–$n$ connected to respective terminals 2–1 to 2–n of a test receptacle. The terminals are connected to respective output contacts 3–1 to 3–n of an electronic circuit card 4. Each of the test condition generators is coupled to a control unit 5, which unit is coupled to a suitable digital CPU (central processing unit) 6 by way of an I/O (input-output) adapter 7. Each output contact 2–1 to 2–n is selectively connectable to an analog to digital converter 8 by way of a switching multiplexor 9 and respective resistor 12–1 to 12–n. The control unit 5 is coupled to an automatic card transport mechanism 10 and to error analysis print out device 11. The transport mechanism 10 includes the test receptacle with the terminals 2–1 to 2–n and means for inserting cards into and removing cards from the receptacle.

When a group of cards 4, all of which are identical, are inserted on the transport mechanism for automatic testing, a program specific to the card type is introduced into the main memory of the CPU for processing of the cards. The CPU will first initiate a setup operation whereby it will cause the control unit 5 to act upon each of the test condition generators 1–1 to 1–n to set each generator so as to produce a respective one of the conditions required for the series of tests performed on each card.

When the control unit has initially adjusted or setup each of the test condition generators, the multiplexor 9 will sequentially connect each of the generator output terminals 2–1 to 2–n to the analog to digital converter 8. The voltage levels at each of the terminals 2–1 to 2–n will be converted to digital form and fed into the CPU by the control unit 5. The CPU will compare the digital signals with specification data to determine whether or not the condition at each terminal 2–1 to 2–n is accurately set.

If there is a minor inaccuracy with respect to any one terminal 2–1 to 2–n, the CPU will cause the control unit 5 to readjust the operating condition of the respective test condition generator 1–1 to 1–n so as to accurately fix the level at its output terminal.

When this setup sequence is completed and all of the test condition generators are suitably adjusted so as to produce the desired output conditions, the CPU will enter the test mode. The test mode consists of alternate WRITE and READ operations under program control. During each WRITE operation the test condition generators 1–1 to 1–n are addressed as required so as to produce at the terminals 2–1 to 2–n the desired test conditions. During each READ operation, a test is performed on the card under test and the test result is fed to the CPU via the multiplexor 9, the converter 8 and the control unit 5.

At the end of the setup operation, the first card 4 is automatically inserted into the test receptacle for connection with the terminals 2–1 to 2–n. When the card 4 is in position, a series of tests is initiated under control of the CPU. Each of the cards 4 will usually require several tests. For each test the required drive, load, power supply and ground and open conditions are applied to the respective card terminals 3–1 to 3–n and verification of the results of each test is made by the computer. Preferably the applied conditions are worst case levels. The test results are derived from one or more of the terminals 2–1 to 2–n and applied to the CPU by way of the multiplexor, the analog to digital converter and the control unit. The CPU compares these test results with circuit specifications stored in the CPU.

The CPU causes the test sequence to continue until each of the tests for a given card has been completed. Assuming that no errors were detected, the card is automatically removed from the test receptacle by the transport mechanism 10 and directed to a storage area for cards which have passed all tests. In the event that the card 4 fails to satisfy one or more tests, the CPU analyzes the failures and causes the unit 11 to print out error analysis data which pinpoints the potential source or sources of trouble. Each card that fails is automatically directed to a different storage area. Subsequent to the successful or unsuccessful testing of each card, the next succeeding card is moved into the test receptacle for connection with the terminals 2–1 to 2–n associated with the test condition generators. The computers then initiates the entire series of tests which are to be conducted with respect to the card.

Each time that a different type of card is to be tested, the CPU must have a new program entered, which program corresponds to the particular type of card to be tested. Subsequent to the entry of the new program, the CPU will again enter the setup mode to again condition each of the test condition generators as required prior to initiating the required tests for the new type card.

Specific attention is directed to the various portions of the test condition generators 1–1 to 1–n. Each of these generators is identical to the others; and therefore, only the generator 1–1 will be shown and described in detail.

The test condition generator 1 comprises a pair of power supplies 20 and 21 which are programmable by the CPU and the control unit 5 to produce at their respective output terminals 22 and 23 voltage levels which lie between widely varying positive and negative limits.

The programming is such as to cause the output terminal 22 to be more positive than the output terminal 23. We prevent the junction 23 from becoming positive with respect to the junction 22 to assure the proper operation of the succeeding semiconductor circuits, some of which are polarity sensitive, and to prevent accidental damage to the circuits. This will be apparent below with respect to the details of the semiconductor circuits connected to junctions 22 and 23.

The power supply 20 includes positive and negative supply terminals 25 and 26 which are coupled to the output terminal 22 by way of a current amplifier 30. Means including the current amplifier 30 fix the output terminal 22 at a selected value between the positive and negative levels of program control. This means also includes a current summing circuit 31 which forms the input to an operational amplifier 32. The output of the operational amplifier is coupled to the input of the current amplifier 30 by way of a current-limiting resistor 33 and a coaxial cable 34. Feedback from the output of the amplifier 30 to the input of the operational amplifier 32 is provided by way of a coaxial cable 35 and a feedback resistor 36.

The cable 35 is terminated in its characteristic impedance at a desired high frequency by means of a resistor 37 and a capacitor 38. A resistor 40 and a capacitor 41 provide a minor feedback loop around the operational amplifier to assure circuit stability.

Both the polarity and level of the voltage at the output terminal 22 are determined by the polarity and value of the current supplied to the input node 42 of the operational amplifier by the current summing circuit 31. This circuit will be described in greater detail later. Briefly, however, it includes means for producing a fixed current, the level of which can be varied in discrete increments of approximately twenty-three microamperes to in turn produce at the output terminal 22 a fixed voltage, the level of which can be varied in discrete increments of approximately twenty-five millivolts. In addition, the summing circuit 31 is selectively connected alternatively to a positive or negative supply terminal 43 or 44 which will cause the voltage at the terminal 22 to be either negative or positive, respectively.

The power supply 21 is generally similar to the power supply 20 and includes positive and negative supply terminals 50 and 51, a current amplifier 52, coaxial cables 53 and 54, an operational amplifier 55, a feedback resistor 56, a current-limiting resistor 57, terminating resistor 58 and capacitor 59, a minor loop feedback resistor 60 and capacitor 61, and a current summing circuit 62.

A Zener diode 63 is coupled between the output circuits of the operational amplifiers 32 and 55 to limit the maximum positive level by which the output of the amplifier 32 can exceed the output of the amplifier 55 to a desired value; for example, fifteen volts. The Zener diode also prevents the output of the amplifier 55 from becoming more than approximately seven-tenths volt more positive than the output of the amplifier 32. In the event that the Zener diode enters either region of low impedance, high conductivity, the resistors 33 and 57 limit the current exchanged between the amplifiers to a value which prevents damage to the amplifiers.

The power supplies 20 and 21 exhibit rapid recovery times incident to changes in the output voltage levels at terminals 22 and 23. An output level change occurs when the supply 20 or 21 is being used as a power supply for a card under test and the card is connected to the contacts 2-1 to 2-n. The sudden rise in current to or from the card under test causes a momentary drop in the voltage level at terminal 22 or 23, depending upon which supply 20 or 21 is used.

If it were possible to locate the energy sources identified by terminals 25, 26, 50 and 51 and the voltage regulating means (amplifiers 30, 32, 52 and 55,) close to the terminals 22 and 23 and to the cards under test, then it would be possible to utilize a conventional regulated power supply to assure rapid recovery times for the output voltage.

However, because of the space occupied by that portion of the condition generators 1-1 to 1-n shown in FIG. 1b, it becomes necessary to locate the regulating amplifiers such as 32 and 55 and the energy sources represented by the terminals 25, 26, 50 and 51 at a considerable distance from the terminals. Thus in one physical realization, the cables 34, 35, 53 and 54 were approximately ten feet long and the energy source cables were approximately five feet long.

If high speed testing is to be achieved, then the power supply recovery must be rapid.

The improved arrangement of supplies 20 and 21 achieves rapid recovery by locating the current amplifiers 30 and 52 adjacent the card under test and by providing a major feedback loop for the amplifiers 32 and 55 which extends from the output of the amplifiers 30 and 52 to the inputs of the amplifiers 32 and 55 by way of the cables 35 and 54. This feedback and current amplifier arrangement has been found to reduce recovery time in one physical realization from five hundred microseconds to fifty microseconds.

A latching voltage switch 70 is coupled between the power supply output terminals 22 and 23. The function of the switch 70 is to couple the voltage level at the supply terminal 22 to a positive driver-load circuit 71 and a negative driver-load circuit 72; or alternatively, to couple the supply terminal 23 to the circuits 71 and 72. When the test condition generator 1-1 is utilized as a driver, the voltage levels existing at the supply terminals 22 and 23 will, when appied to the selected driver, form the upper and lower logical input levels to a specific input contact of the card under test. The switch 70 is driven from one state to the other to couple the supply terminal 22 or the supply terminal 23 to its output by means of input signals from a line driver 73 which is controlled by the CPU via the control unit 5.

A pair of controlled level collector supplies 80 and 81 are provided for the driver-load circuits 71 and 72. The supply 80 provides an output voltage level for each of the driver-load circuits which is equal to the level at the supply terminal 22 plus a fixed value, e.g. six volts. The supply 81 produces an output voltage level for the circuits 71 and 72 which is equal in value to the level at the supply terminal 23 minus a fixed value, e.g. six volts. The function of the supplies 80 and 81 is to provide low cost, high speed switching within the circuits 71 and 72 with minimum power dissipation levels.

Each of the driver-load circuits 71 and 72 is connected to a source of current 82 which is programmed by the CPU via the control unit 5 to have any selected value between one milliampere and one hundred milliamperes in increments of one milliampere. The current source 82 is connected alternatively to positive or negative supply terminals 83 or 84. When the circuit 82 is connected to the supply terminal 83, it supplies current to the driver-load circuit 72; and when it is connected to the supply terminal 84 it receives current from the driver-load circuit 71.

A relay-operated contact assembly 90 selectively connects the output terminal 2-1 to that portion of the test condition generator 1-1 which produces the desired test condition. Specifically, the contact assembly can connect the output terminal 2-1 alternatively to ground potential, to an open circuit contact, to the positive or negative supply terminals 22 or 23, to the circuit 71 operated as a driver or to the circuit 71 operated as a load, to the circuit 72 operated as a driver or to the latter circuit operated as a load. The contact assembly 90 will be in the same condition when the test condition generator is operated as either a positive or negative load, this positive or negative function being determined by the polarity of the supply terminal 83 or 84 to which the circuit 82 is connected. The contact assembly 90 is controlled by a relay-selection circuit 91 which is in turn under the control of the CPU via the control unit 5.

Figure 3:
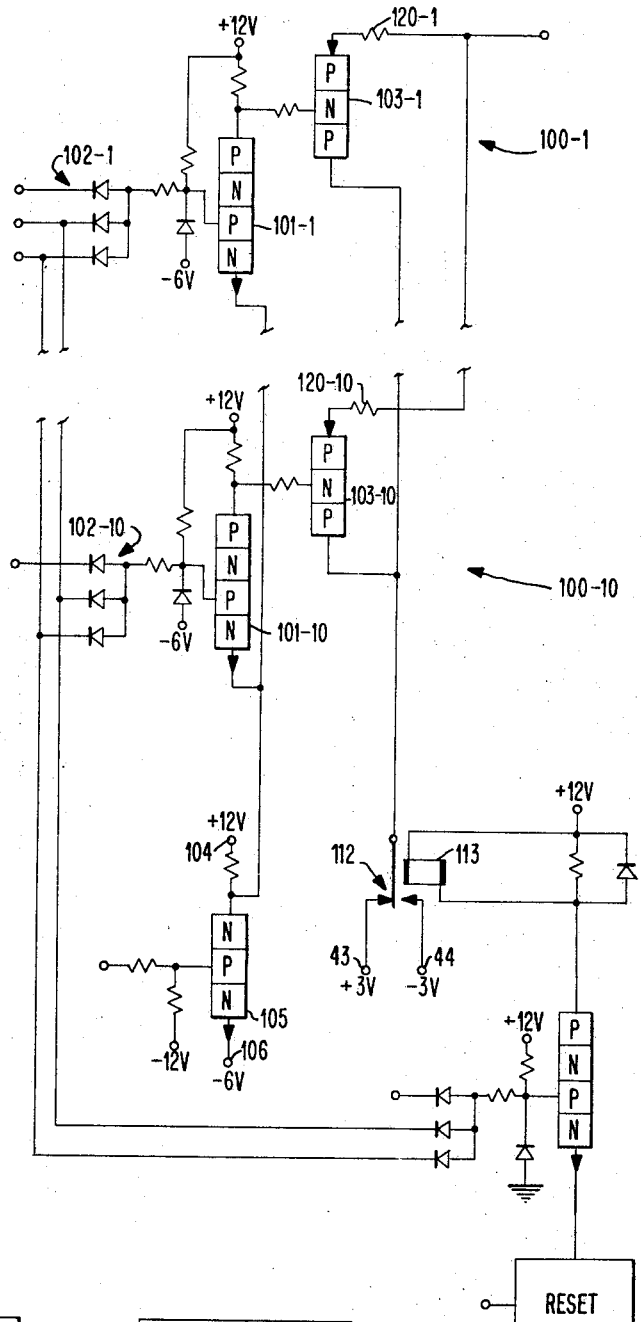
FIGS. 3 and 4 are fragmentary schematic diagrams of current summing sources utilized in the improved circuit of the present invention.
Figure 2:
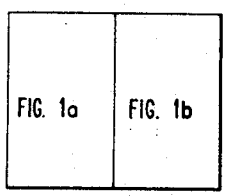
FIG. 2 shows how
Figure 6:
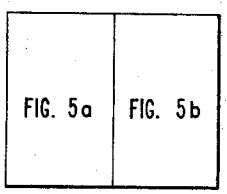

Attention is directed to FIG. 3 which illustrates a preferred form of the current summing circuit 31. The current summing circuit 62 is preferably identical to the circuit 31 and, therefore, the following detailed explanation with respect to FIG. 3 applies to the circuit 62 as well as circuit 31.

It will be recalled that the function of the current summing circuits 31 and 62 and their associated operational amplifiers 32 and 55 and current amplifiers 30 and 52 is to set up under program control predetermined power supply levels at output terminals 22 and 23. The level and polarity of the currents produced in circuits 31 and 62 for application to the input nodes of the operational amplifiers 32 and 55 determine the level and polarities of the supply potentials at terminals 22 and 23.

In the preferred embodiment which will be described below, the current summing networks in circuits 31 and 62 are selectively controllable to produce positive or negative current levels in increments of approximately twenty-three thousandths milliamperes within an absolute range from approximately twenty-three thousandths milliamperes to approximately twelve milliamperes. This will in turn cause the operational amplifiers to produce positive and negative output voltages varying in increments of twenty-five millivolts within a range from twenty-five millivolts to approximately twelve and eight-tenths volts, absolute. The operational amplifiers 32 and 55 of the preferred embodiment produce a polarity inversion from input to output; thus if negative currents are injected into their inputs by the circuts 31 and 62, the polarity of the voltages at the output terminals 22 and 23 will be positive. If the input currents are positive, the output voltage will be negative.

Circuit 31 in the preferred embodiment comprises ten independently controlled circuits 100-1 to 100-10, only two of which are shown. Each of these circuits produces a different discrete output current of either polarity, when selectively energized under program control.

The circuit 100-1 includes a silicon-controlled rectifier 101-1 which is selectively energized and latched in response to satisfaction of the input AND circuit 102-1 by input logical signals from the CPU via the control unit 5. The output of the rectifier is coupled to the base electrode of a chopper transistor amplifier 103-1. The latter transistor is of the type which is characterized by an extremely low collector to emitter voltage drop in saturation and which is typically controlled by forward biasing of the base-collector junction by an input signal.

The cathode of the rectifier 101–1 is connected in common with the cathodes of other rectifiers such as 101–10 to a source of positive potential 104 which normally assures resetting of the rectifiers to their nonconductive conditions. When it is desired to prepare the rectifiers for energization by selected logical inputs to their control electrodes, a transistor switch 105 is turned on to apply the negative potential at the terminal 106 to the cathodes of all of the rectifiers. The transistor 105 is maintained in its on state except for those time periods when it is desired to reset energized rectifiers.

When the rectifier 101–1 is conducting, the negative potential at the terminal 106 is applied by way of the transistor 105 and the rectifier 101–1 to the base electrode of the transistor amplifier 103–1. This negative potential is sufficient to drive the transistor 103–1 to its saturated condition, irrespective of the bias supply connected to the collector electrode. The collector bias supply will be positive or negative by reason of the connection of either the terminal 43 or the terminal 44 to the collector by way of contacts 112 on the relay 113. The relay 113 is selectively maintained in its on or off condition under program control, depending upon the polarity which is desired for the voltage at the terminal 22 of the power supply 20.

The circuit 100–10 is identical to the circuit 100–1 except for the values of the precision resistors 120–1 and 120–10 in the emitter circuits of the transistors 103–1 and 103–10. The same reference numerals with different subscripts are utilized for corresponding components in the circuits 100–1 and 100–10. When the transistor 103–1 is turned on to saturation, the precision resistor 120–1 will produce a current having an absolute value of approximately twenty-three thousandths milliamperes, i.e. three volts divided by one hundred twenty-eight kilohms. This current will be positive or negative, depending upon which supply terminal 43 or 44 is connected to the collector electrode of the transistor 103–1. In the event that the transistor 103–10 is energized, the precision resistor 120–10 will similarly produce a positive or negative current having an absolute value of twelve milliamperes, e.g. three volts divided by twenty-five hundredths kilohms.

The resistors corresponding to resistors 120–1 and 120–10 in each of the other circuits 100–2 to 100–9 (not shown), have selected values, each of which is one-half of the value of the corresponding resistor having the next lower subscript number. Thus the value of the resistor 100–2 (not shown) would be sixty-four kilohms, resistor 120–3 thirty-two kilohms, etc. The combination of the bistable silicon-controlled rectifier 101–1 with its logical input circuit and the chopper transistor amplifiers 103–1 having its base-collector junction selectively biased by the rectifiers to produce precision current levels of either polarity in their emitter circuits, provides an unusually effective and reliable current summing network which has a high degree of simplicity yet versatility. The value of this combination is further enhanced by the fact that it can produce output currents of either polarity by the simple expedient of selective coupling of positive or negative bias potentials to the collectors of the chopper amplifiers. Known current summing networks capable of achieving similar results are much more complex and costly.

Figure 4:
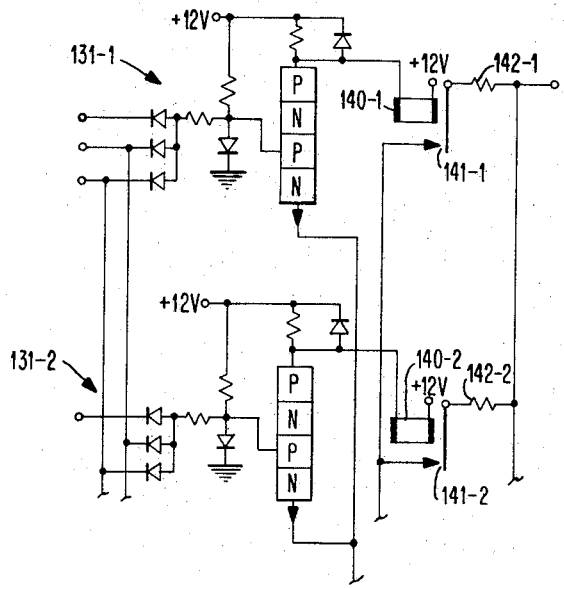
Figure 4:
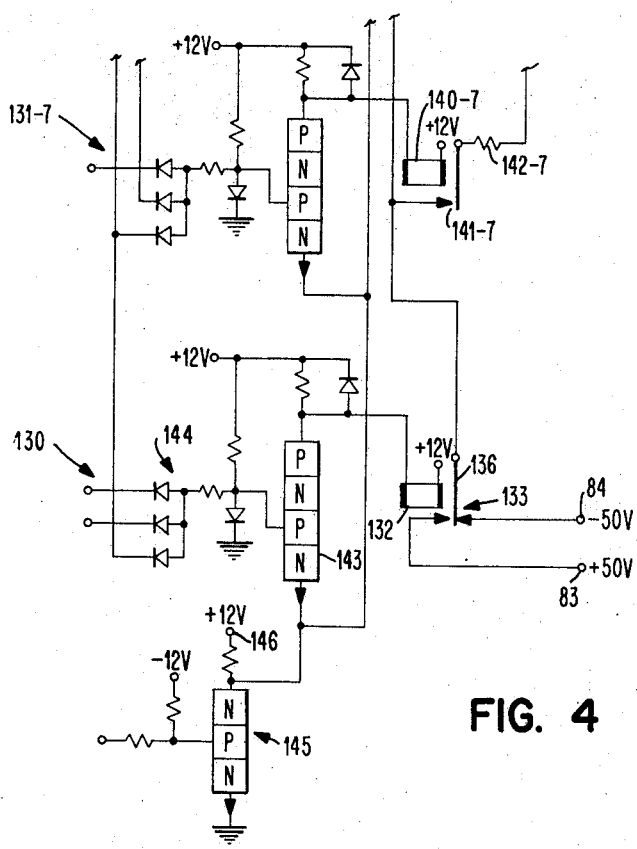

Attention is now directed to FIG. 4 which illustrates the details of a preferred form of the current source 82 which, as indicated above, it programmed to produce in combination with the circuits 71 and 72, absolute values of current between one milliampere and one huundred milliamperes in increments of one milliampere. These currents are selected to be either positive or negative under program control.

The circuit 82 includes a polarity selection circuit 130 and a plurality of current level selection circuits 131–1 to 131–7, only three of which are shown. The circuit 130 includes a relay 132 which selectively energizes a contact set 133 to connect either the positive or negative supply terminal 83 or 84 to the armature 136.

The circuits 131–1 to 131–7 include relays 140–1 to 140–7 which selectively control the operation of contacts 141–1 to 141–7. Each contact such as contact 141–1, when closed, completes a direct-current circuit from the supply terminal 83 or terminal 84 through a respective precision resistor such as 142–1 to contribute at least one portion of the selected output current from the source 82. Each resistor 142–1 to 142–7 is twice the value of the corresponding resistor with the next lower subscript number, ranging from five hundred twenty-seven ohms for resistor 142–1 to thirty-three and seven-tenths kilohms for resistor 142–7. In the preferred embodiment, resistor 142–1 will produce sixty-four milliamperes; resistor 142–7 one milliampere. Selection of one or more relays 140–1 to 140–7 provides the selected ouput current level. Selection of the relay 132 determines the polarity of the current.

The state of the relay 132 is controlled by a silicon-controlled rectifier 143, which is in turn controlled by an input logical AND circuit 144. The cathode of the rectifier 143 is connected to the collector electrode of a transistor amplifier 145. The latter transistor is normally maintained in its on condition to apply ground potential to the cathode of the rectifier 143. With ground potential applied to the cathode, positive signals applied to the inputs of the AND circuit 144 will initiate turn-on of the rectifier 143, the rectifier latching itself in its conductive condition. When the rectifier is conducting, it eneigizes the relay 132. To reset the rectifier 143, the transistor 145 is turned off, whereby a positive reset potential from the terminal 146 is applied to the cathode of the rectifier.

The energizing circuits for the relays 140–1 to 140–7 are similar to that described with respect to relay 132 and, therefore, will not be described in detail.

Figure 5A:
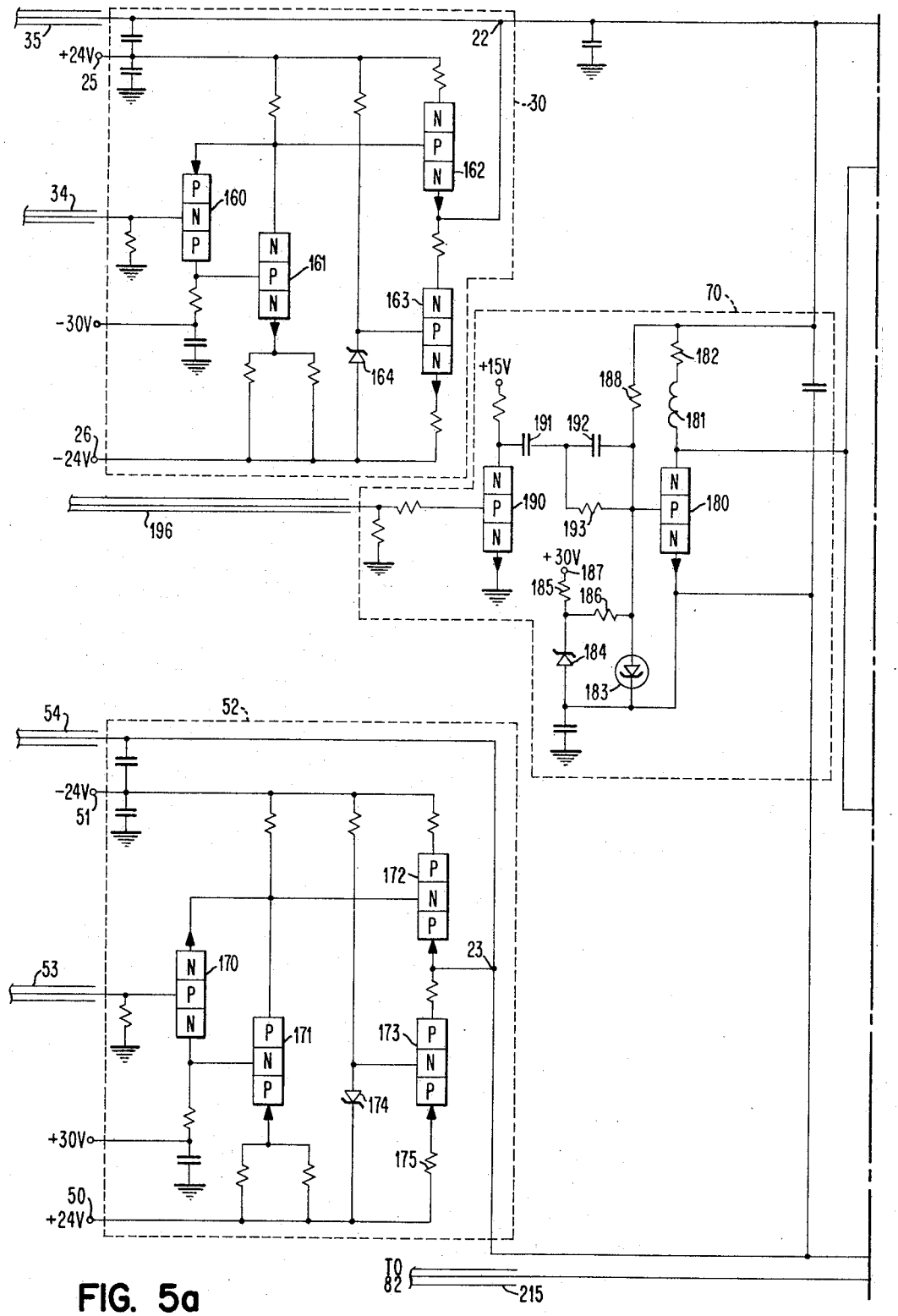
FIGS. 5a and 5b are schematic diagrams illustrating the improved power supply, driver and load circuit of the present invention.
Figure 5B:
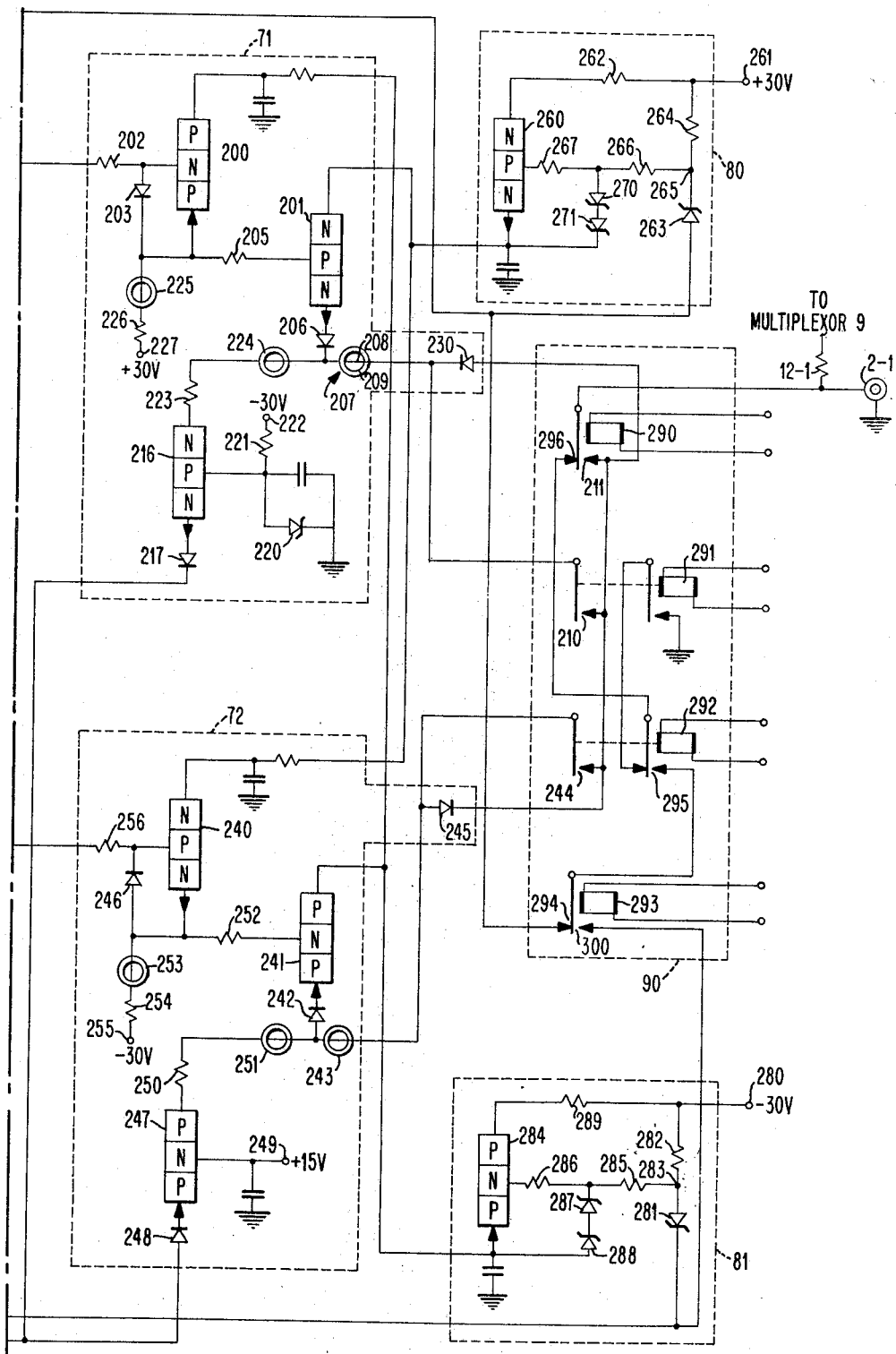

The combination positive and negative power supply, and negative driver and positive or negative load circuit will now be described in detail, reference being directed to FIGS. 5a and 5b. It will be recalled that this combination circuit includes current amplifiers 30 and 52 which are the final stages of the power supplies 20 and 21, a switch 70, positive and negative driver-load circuits 71 and 72, collector supplies 80 and 81 and a contact assembly 90.

The current amplifier 30 is a high gain current amplifier stage with essentially unity voltage gain. The amplifier 30 includes a pair of transistors 160 and 161 which are connected as a second-collector-to-first-emitter negative feedback amplifier to provide high current gain to drive an output emitter follower 162.

The various impedances included within the amplifier 30 are selected so as to prevent a catastrophic failure in the event that the output terminal 22 becomes shorted to another power supply by way of their respective output terminals 2–1 to 2–n and the circuit card under test.

With the generator 1–1 functioning as a power supply, the emitter follower 162 is capable of supplying up to five hundred milliamperes of current to a card under test at any voltage level which is programmed to the output supply terminal 22 between upper and lower limits of plus and minus six volts. As the programmed voltage level at the output terminal 22 is increased from an absolute value of six volts to an absolute value of twelve volts, the current supplying capability of the emitter follower 162 decreases substantially linearly from five hundred milliamperes to approximately three hundred milliamperes.

When current is removed from a card under test by the amplifier 30 acting as a current drain, the current flow is from the card under test into the output terminal 22. From the terminal 22, the current flows through a source of constant current including common base transistor amplifier 163, a Zener diode 164 and a resistor 165. The resistor 165, the base-emitter junction resistance of the transistor 163 and the voltage across the Zener diode 164 fix the constant current level. It will be noted that this constant current is being drained from the emitter follower 162 during those periods when the emitter follower is supplying current to the device under test. Consequently, when the emitter follower is supplying five hundred milliamperes to the device under test, it is also supplying the constant current requirements of the transistor 163. The transistor 163 of the constant current means is capable of accepting a maximum of one hundred milliamperes of current from the card being tested, when the test condition generator is acting as a power supply. When the transistor 163 is in fact accepting the maximum one hundred milliamperes of current from the device under test, it is also receiving a predetermined amount of current from the emitter follower 162. In those instances in which the device under test delivers less than the maximum one hundred milliamperes, the emitter follower 162 will supply the required increase in current to the transistor 163.

The circuit 52 is similar to the circuit 50 except that the transistor types and their supply potential polarities are reversed with respect to the corresponding components in the circuit 30. Thus the circuit 52 includes a first negative feedback amplifier stage including a pair of transistors 170 and 171, an output emitter follower 172 and a constant current source including a transistor 173, a Zener diode 174 and a resistor 175.

The emitter follower 172 includes a PNP transistor and, therefore, receives current from the device under test; whereas the common base transistor amplifier 173 is a PNP which delivers current to the card under test, when the test condition generator 1-1 is utilized as a power supply.

When the card under test requires in excess of one hundred milliamperes or must deliver current at a level in excess of one hundred milliamperes, the proper one of the two power supplies 20 or 21 must be selected so as to be capable of delivering or accepting the desired level of current. Thus the supply 20 will be selected for delivering current levels between one hundred and five hundred milliamperes, and supply 21 will be selected for accepting current levels between one hundred and five hundred milliamperes. Either supply 20 or 21 may be selected when the maximum anticipated current level is one hundred milliamperes or less. The floating tunnel diode latch 70 of FIG. 5a is the subject matter of the above-mentioned copending application of Friedrich A. Karner, and said application is specifically incorporated herein as if it were set forth in its entirety. Briefly, it is the function of the latch 70 to couple the power supply output terminals 22 and 23 to the circuits 71 and 72, when the test condition generator 1-1 is utilized alternatively as a driver or a load. Thus the latch acts essentially as a voltage switch. One of the prerequisites of the latch 70 in the environment of use is that the input to output voltage drop be maintained at a relatively low value and relatively constant. When acting as a switch, the latch 70 connects either the terminal 22 or the terminal 23 to circuits 71 and 72.

Another important requirement of the tunnel diode latch is that it apply the two voltage levels to the device under test at high speed, e.g. ten nanoseconds. That is, we want a fast transition from one level to the other. This is required in order to couple sufficient energy into cards under test which are A-C (alternating-current) coupled (via capacitors or transformers) to cause them to function properly. For example, A-C coupled triggers and latches include two or more inputs, one of which requires an input drive pulse having a very steep leading edge.

However, the most important problem which arises with respect to the requirements of the latch 70 revolves about the use of the potential levels at the terminals 22 and 23 as the positive and negative operating supply of the latch. Thus these supply potentials not only are switched by the latch, but they also form the bias for the latch. From what has been said above, it will be appreciated that the supply 22 may vary anywhere between plus and minus twelve volts, and that the supply potential at the terminal 23 may also be varied between plus and minus twelve volts. Consequently, extremely wide variations in bias supplies must be tolerated by the latch without malfunction. One of the most difficult requirements results from the system requirement that the difference in potential between the supply terminals 22 and 23 may be as low as five-tenths volt. As we have seen above, the maximum potential difference between the terminals 22 and 23 is in the order of approximately thirteen volts. Consequently, the design of a latch meeting these requirements becomes extremely difficult.

The latch 70 includes a common emitter transistor switch 180 having its emitter electrode connected directly to the supply terminal 23 and its collector electrode connected to the supply terminal 22 by way of a speed-up inductor 181 and a current-limiting resistor 182. A tunnel diode 183 is connected across the base-emitter terminals of the transistor 180 to form a latching function. That is, when the tunnel diode is in its low voltage, high current state, it maintains the transistor 180 in its nonconductive state. When the tunnel diode is in its high voltage, low current state, it assures forward biasing of the base-emitter junction of the transistor 180 to the saturation level. A gallium arsenide tunnel diode will provide this function satisfactorily.

A substantially constant bias current, for example one and six-tenths milliamperes, is provided for the tunnel diode by means of a Zener diode 194, resistors 185 and 186 and a positive supply terminal 187. An additional bias supply resistor 188 couples the tunnel diode and the transistor base electrode to the supply terminal 22. The value of the supply potential at the terminal 187 must be several volts higher than the upper limit of the positive potential which can be programmed at the power supply output terminal 23. Thus, for example, if the terminal 23 has a maximum positive value in the order of twelve volts and a ten-volt Zener diode 184 is used, the potential at the supply terminal 187 must be substantially higher than the sum of the potential at 23 plus the voltage drop across the Zener diode.

The resistor 188 provides a variable bias current for the transistor 180 and the diode 183. The collector current of the transistor 180 at saturation varies in proportion to the difference in voltage which exists between the supply terminals 22 and 23. Increased values of base current are required to ensure saturation of the transistor as the difference in voltage between the supply terminals 22 and 23 increases.

The current supplied by the constant current source including the Zener diode 184, the resistor 185, 186 and the positive supply terminal 187 could be set at a high value which guarantees operation of the transistor 180 in saturation when the difference in voltage between terminals 22 and 23 is maximum. This would obviate the need for the adidtional bias current through the resistor 188; however, it would cause base current much in excess of that required for low emitter-to-collector supply voltages. Excessive base current at the low supply levels would unduly increase the transistor turn-off delay. Consequently, we use the combination of a constant current and a variable current.

The resistor 188 produces a bias current for the tunnel diode 183 and the base of the transistor 180 which is a linear function of the difference in voltage between the terminals 22 and 23. This additional bias current from the resistor 188 will assure saturation of the transistor 180 at all supply levels while maintaining high speed operation.

Turn-on and turn-off pulses for the latch 70 are provided by a common emitter transistor switch 190. The collector electrode of the switch 190 is coupled to the base electrode of the switch 180 by means of a pulse-differentiating capacitor 191 and a pulse shaping network including a parallel-coupled capacitor 192 and resistor 193. The base electrode is coupled to the line driver 73

(FIG. 1a) by way of an input circuit 195 and a cable 196.

Each time that the transistor 190 is turned on and off respectively, in response to input pulses at its base electrode, the capacitor 191 produces negative and positive voltage spikes, respectively. These positive and negative spikes are coupled to the tunnel diode and to the base electrode of the transistor 180 by the capacitor 192 and the resistor 193. The value of the capacitor 192 is selected to be significantly smaller than that of the capacitor 191, whereby the total energy content of the positive and negative spikes applied to the tunnel diode and base electrode of the transistor 180 is held to a minimum value; yet sufficient current is provided to reliably switch the latch 70 from one state to the other. If the energy in the output pulse from the capacitor 191 were applied directly to the tunnel diode and the base electrode of the transistor 180, both devices would be overdriven; and deterioration of the tunnel diode characteristics would very likely result.

The positive driver-load circuit 71 comprises a pair of cascade connected emitter followers 200 and 201 of opposite conductivity type. The output of the tunnel diode latch 70 is connected to the base electrode of the emitter follower 200 by way of a resistor 202, which resistor is included to inhibit parasitic oscillations. A diode 203 coupled across the base-emitter electrodes of the emitter follower 200 assures fast positive transitions in the drive level. The output of the emitter follower 200 is coupled to the base electrode of the emitter follower 201 by way of a resistor 205 which also inhibits parasitic oscillations. The emitter electrode of the emitter follower 201 is coupled to the output terminal 2-1 of the test condition generator 1-1 by way of a diode 206, an inductive device 207 in the form of a wire 208 threaded through a ferrite core 209 and normally open contacts 210 and 211. The diode 206 prevents reverse breakdown of the base-emitter junction of the emitter follower 201. The inductive device 207 prevents ringing during the rapid ten nanosecond transients produced when the tunnel diode latch 70 switches from one state to another.

The circuit 71 also includes a current source, the level of which is programmable under the control of circuit 82. The circuit 82 couples the negative fifty-volt supply to the circuit 71 by way of a diode 217, a coaxial cable 215 and certain ones of the resistors 142–1 to 142–7 (FIG. 4). This will cause a common base amplifier 216 to be energized to produce at its collector electrode a fixed current, the level of which is determined by the particular resistors 142–1 to 142–7 which have been connected in the circuit.

The base electrode of the amplifier 216 is connected to a negative fifteen-volt source comprising a Zener diode 220, a resistor 221 and a negative supply terminal 222. The diode 217 prevents reverse breakdown of the base-emitter junction of the amplifier 216, when the circuit 82 connects a positive fifty-volt potential to the coaxial cable 215. The collector electrode of the amplifier 216 is conducted to the junction between the diode 206 and the inductive device 207 by way of an isolating resistor 223 and an inductive device 224.

The resistor 223 isolates the collector electrode of the amplifier 216 from the emitter follower 201 to permit very fast rise times in the output signal of the emitter follower. It also serves the function of reducing the collector-to-base voltage drop of transistor 216, thereby minimizing power dissipation in the amplifier 216 for widely varying programmed current levels in the amplifier. The inductive device 224 presents a very high impedance to the output of the emitter follower 201 during the very fast positive and negative transients in its output voltage.

The emitter followers 200 and 201 are biased by means including an inductive device 225 and a resistor 226 which are connected to a positive supply terminal 227. During the rapid switching transients in the output of the emitter follower 200, the inductive device 225 isolates the bias resistor 226 from the output of the emitter follower 200, permitting most of the energy to be directed to the second stage emitter follower 201. Thus the device 225 improves the frequency response of the emitter follower 200.

The circuit 71 is effective alternatively as a driver or as a load when the circuit 82 applies a negative potential to the coaxial cable 215 and when the normally open contacts 211 are closed. Whether it is a driver or a load then depends in part upon the condition of the normally open contacts 210. When the contacts 210 are open, a diode 230 connects the circuit 71 to the terminal 2–1 and the circuit acts as a load. When the contacts 210 are closed, the diode 230 is bypassed and the circuit 71 acts as a driver; that is, current can flow in either direction into or out of the circuit 71.

The circuit 72 is the negative driver-load circuit. It is generally similar in structure and mode of operation to the driver-load circuit 71. However, the conductivity types of the transistor amplifiers, as well as the bias and operating supplies for the amplifiers, are the opposite of those in circuit 71. Thus the circuit 73 includes a pair of cascaded emitter followers 240 and 241 coupling the output of the latch 70 to the output terminal 2–1 of the test condition generator 1–1 by way of a diode 242, an inductive device 243, normally open contacts 244, or alternatively, a diode 245 and normally open contacts 211. When the contacts 244 are open, the diode 245 is effective, whereby the circuit 72 acts as a load. When the contacts 244 are closed, the diode 245 is short-circuited and the circuit 72 acts as a driver.

A diode 246 is coupled across the base-emitter electrodes of the emitter follower 240 to improve the drive characteristics of the amplifier 240 during negative-going transients. The circuit 72 also includes a common base amplifier 247 which has its emitter electrode coupled to the circuit 82 by way of a diode 248 and the coaxial cable 215. The base electrode of the amplifier 247 is connected to a positive bias supply terminal 249. The collector electrode of the amplifier 247 is connected to the junction between the diode 242 and the inductive device 243 by way of a resistor 250 and an inductive device 251. A resistor 252 couples the emitter electrode of the emitter follower 240 to the base electrode of the emitter follower 241. The emitter followers 240 and 241 are biased by means including an inductive device 253 and the resistor 254 which are connected to a negative supply terminal 255. The output terminal of the latch 70 is coupled to the base electrode of the emitter follower 240 by means of a resistor 256.

The various components in the circuit 72 correspond to similar components in the circuit 71, performing similar functions and, therefore, will not be described in detail.

The structure and function of the controlled level collector supplies 80 and 81 will now be described in detail.

As indicated earlier, the function of the supplies 80 and 81 is to permit high speed switching in the emitter followers of the driver-load circuits 71 and 72 without resorting to expensive transistors. The response time of the circuits 71 and 72 must be very rapid, for example, ten nanosecond transients. To maintain minimum power dissipation levels, the base-collector junctions of the emitter followers are reverse biased by a minimum fixed voltage by means of supplies 80 and 81, irrespective of the absolute values of the voltage levels at the base electrodes.

The supply 80 includes an emitter follower 260 having its emitter electrode connected to the collector electrodes of the emitter followers 201 and 240 of the circuits 71 and 72, respectively. The collector electrode of the emitter follower 260 is coupled to a positive supply terminal 261 by way of a resistor 262 which limits the power dissipation of the emitter follower 260.

The voltage level at the emitter electrode of the emitter follower 260 is determined essentially by the voltage level which exists at the output terminal 22 of the supply 30. The terminal 22 is connected to the supply terminal 261 by way of a Zener diode 263 and a resistor 264. The diode 263 is always operated in its reverse breakdown mode to produce a fixed voltage drop (e.g. six volts) between the output terminal 22 of the supply and a junction 265 between the Zener diode and the resistor 264. This junction 265 is coupled to the base electrode of the emitter follower 260 by way of resistors 266 and 267.

The resistor 267, together with a pair of Zener diodes 270 and 271, limits the current supplied by the emitter follower 260 to the emitter follower 201 when the output terminal 2-1 becomes short-circuited. More specifically, when the base current of the emitter follower 260 reaches a selected maximum value, the Zener diodes 270 and 271 become forward biased to prevent further increase in the base current. Under these conditions, the resistor 266 limits the current through the Zener diodes 270 and 271, whereby damage to the circuits is prevented.

The voltage level at the junction 265 equals the voltage level established at the output terminal 22 plus the fixed voltage drop across the Zener diode 263. This voltage, less the small drops across the resistors 266 and 277 and less the base-emitter voltage drop of the emitter follower 260, is applied to the collector electrodes of the emitter followers 201 and 240. Thus the voltage level established at these colectors is always a preselected amount more positive than whatever level is set at the output terminal 22 of the power supply 30. When the latch 70 is off, this voltage level at the output terminal 22 is also applied over circuits described above to the base electrodes of the emitter followers 201 and 240. Hence, with the latch 70 turned off, a constant collector-to-base voltage difference is maintained in the emitter followers, irrespective of the absolute value of the base voltage. With the latch 70 turned on, the collector-to-base voltage difference of the emitter followers 201 and 240 is minimized.

The collector supply 81 similarly maintains a fixed base-to-collector voltage drop in the emitter followers 200 and 241 of circuits 71 and 72, when the latch 70 is turned on to connect the output terminal 23 of the voltage supply 21 to the inputs of the circuits 71 and 72. The circuit 81 is similar in structure and function to the circuit 80 except that the polarities of its semiconductor elements and supplies are reversed.

More particularly, the output terminal 23 is connected to a negative supply terminal 280 by way of a Zener diode 281 and a resistor 282. The junction 283 between the Zener diode and the resistor is connected to the base electrode of an emitter follower 284 by way of resistors 285 and 286. A pair of Zener diodes 287 and 288 connect the junction between the resistors 285 and 286 to the emitter electrode of the emitter follower 284. The collector electrode of the emitter follower is connected to the terminal 280 by way of a resistor 289. The emitter electrode of the emitter follower 284 is connected to the collector electrodes of the emitter followers 200 and 241.

The function of corresponding components in the circuits 80 and 81 is similar and, therefore, no further description will be made with respect to the components in the supply 81.

The function which is performed by the test condition generator 1-1 is determined in part by the selective operation of relays 290-293, inclusive, which relays are controlled by the selection circuit 91 of FIG. 1a.

Table A below illustrates the energized (x) and de-energized (—) conditions of the relay coils 290-293 for each condition which the generator 1-1 can produce:

TABLE A

|  | 290 | 291 | 292 | 293 |
|---|---|---|---|---|
| Positive driver | x | x | — | — |
| Negative driver | x | — | x | — |
| Positive load | x | — | — | — |
| Negative load | x | — | — | — |
| Positive power supply | — | — | x | — |
| Negative power supply | — | — | x | x |
| Ground | — | x | — | — |
| Open circuit | — | — | — | — |

When the generator 1-1 is utilized as a positive driver, the relays 290 and 291 are energized and the relays 292 and 293 are not energized. In this instance, the output terminal 2-1 is connected to the output of the driver-load circuit 71 by way of closed contacts 211 and 210.

When the generator 1-1 is used as a positive load, only the relay 290 is energized. In this instance, the terminal 2-1 is again connected to the output of the driver-load circuit 71 except that the connection is now by way of the contacts 211 and the diode 230.

When the generator 1-1 is utilized as a negative driver, only the relays 290 and 292 are energized. In this instance, the output terminal 2-1 is connected to the output of the driver-load circuit 72 by way of contacts 211 and 244.

When the generator 1-1 is used as a negative load, only the relay 290 is energized. In this instance, the output terminal 2-1 is connected to the output of the driver-load circuit 72 by way of contacts 211 and diode 245.

It will be noted that the same relay selection is made for both positive and negative load conditions, i.e. only the relay 290 is energized. Both circuits 71 and 72 are, therefore, connected to the output terminal 2-1. However, only that circuit which has its common base amplifier 216 or 247 rendered conductive by the negative or positive source from the circuit 82, can provide the load function. Thus if the circuit 82 has been programmed to provide a negative output voltage, the transistor 216 is turned on to provide a positive load function. If the circuit 82 has been programmed to provide a positive output voltage, the transistor 247 is rendered conductive to provide a negative load function.

In this regard, it will be noted that the diodes 206 and 230 are oppositely poled and, therefore, cannot produce a series current path. Similarly, the diodes 242 and 245 are oppositely poled and cannot provide a series current path. This leaves only the transistors 216 and 247 for completing load current paths.

When the generator 1-1 provides a positive power supply, only the relay 292 is energized. In this instance, the output terminal 22 of the supply 20 is connected to the output terminal 2-1 by way of the normally closed contacts 294, normally open contacts 295 and normally closed contacts 296.

When the generator 1-1 is used as a negative power supply, only the relays 292 and 293 are energized. In this instance, the output terminal 23 of the supply 21 is connected to the terminal 2-1 by way of the normally open contacts 300 and 295 and the normally closed contacts 296.

It will be recalled that although we normally use the supply 20 as the positive power supply and the supply 21 as a negative supply, nevertheless, they can be utilized as supplies of the opposite polarity so long as the current requirements are no greater than one hundred milliamperes.

Figure 7:
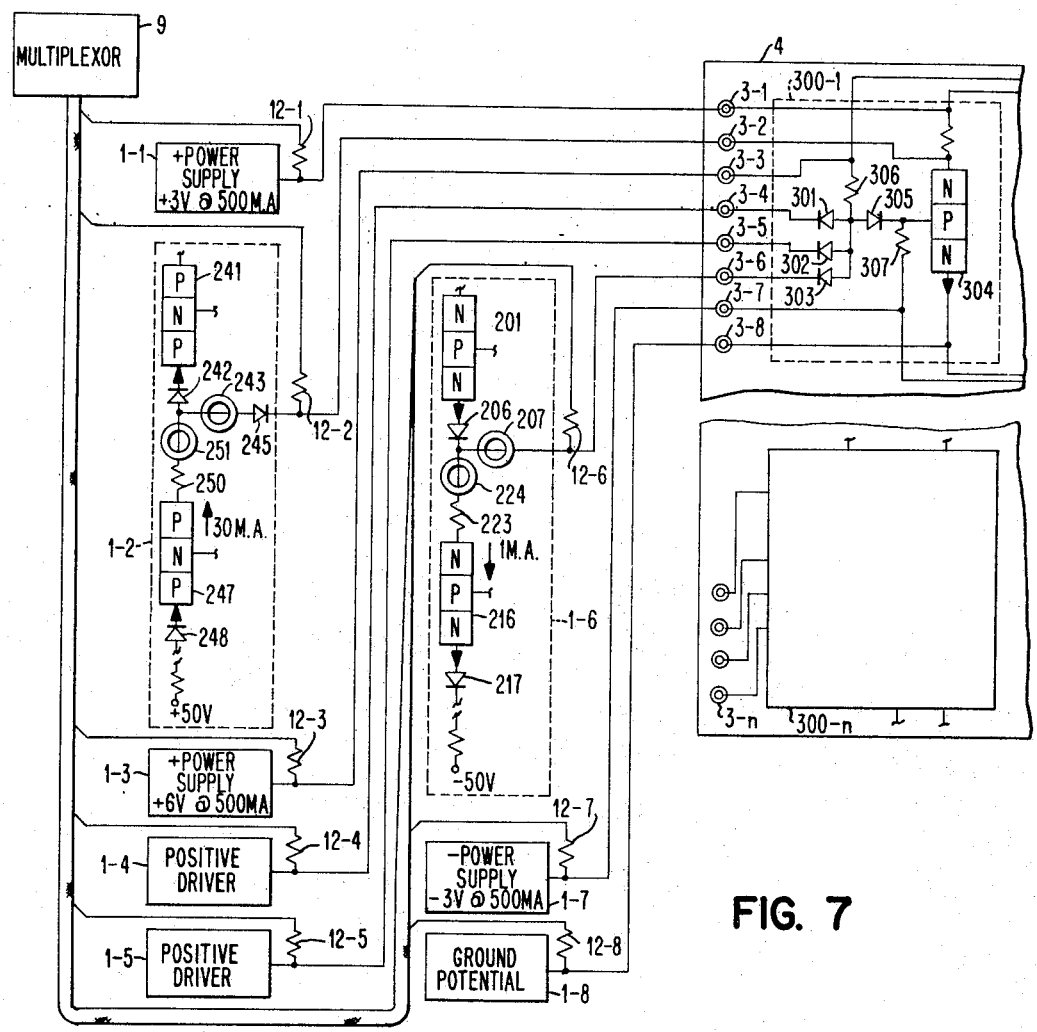
FIGS. 7 and 8 illustrate portions of typical electronic circuit cards which can be tested by the apparatus of the present invention.

FIG. 7 illustrates a typical card 4 which may be tested by the improved apparatus of the present invention. Components in the test condition generators 1-2 and 1-6 have been assigned the same reference numerals as the corresponding components in FIGS. 5a and 5b.

The card 4 includes a plurality of similar circuits 300-1 to 300-n. In a typical arrangement, the power supply connection for each of the circuits 300 will be common, whereas each of the input terminals and each of the output terminals is typically individual to a respective circuit 300.

In FIG. 7 the circuit 300-1 is illustrated as a three-way positive AND/INVERT circuit. Its function is to produce ground potential at the output terminal 3-2 only if suitable positive potentials are applied to all input terminals 3-4, 3-5 and 3-6. The circuit includes input diodes 301, 302 and 303 coupling the input terminals 3-4, 3-5 and 3-6 to the base electrode of a transistor inverter 304 by way of a coupling diode 305. A resistor 306 connected to a positive supply terminal 3—3 and a resistor 307 connected to a negative supply terminal 3-7 form a voltage divider in conjunction with the diode 305. The collector bias resistor 308 is connected to a positive potential terminal 3-1.

Each of the card terminals 3-1 to 3-8 is connected to a respective one of the test condition generating circuits 1-1 to 1-8. Each of the circuits 1-1 to 1-8 is programmed as described above to provide the desired test condition. Thus the circuits 1-1 to 1-8 are respectively programmed to provide a positive three-volt supply, a negative load, a positive six-volt supply, three positive drivers, a negative three-volt power supply and a ground reference. The operation of the test condition generators to provide a reference potential or a supply potential has been described above in detail and requires no further amplification.

The function and operation of the positive driver of generator 1-4 will now be described in detail. Data corresponding to the input and output specifications for the circuit 300-1 will have been entered into the CPU during the set-up operation. This data will have been used to set the voltage and current conditions in the test generating circuits which are utilized as drivers and loads.

Typical input specifications for the circuit 300-1 are as follows: (1) when the input voltages on all three input terminals 3-4, 3-5 and 3-6 are equal to or more positive than plus one volt, the transistor inverter 304 should be turned on to its saturated state; (2) if any one of the input voltages to the terminals 3-4, 3-5 or 3-6 is equal to or more negative than plus three-tenths volt and the current drain is equal to or less than one milliampere, the transistor inverter 304 will be turned off.

Assume that drivers 1-4, 1-5, and 1-6 apply a positive one-volt potential to the diodes 301 to 303. If the circuit 300-1 operates properly, the voltage at the junction of the input diodes and the resistor 306 rises to a positive value equal to the voltage across the forward biased diode 305 and base-emitter junction of the transistor 304, e.g. approximately one and four-tenths volt.

Thus an input voltage to a terminal 3-4, 3-5 or 3-6, which is equal to plus one volt, should bias its respective input diode to its high impedance, low current state. For all practical purposes, it can be said to be reverse biased. If all input diodes are properly reverse biased and assuming the D-C bias connections provided by the resistors 306 and 307 and the diode 305 are within specification, the transistor inverter 304 should turn on to its region of saturation. With this condition, the current supplied by the generator 1-3 via the resistor 306 flows through the diode 305; and part flows through the resistor 307 to the generator 1-7 and the remainder into the base electrode of the transistor 304. This current through the resistor 306 establishes a voltage level of approximately one and four-tenths volt at the junction between the resistor 306 and the diode 305.

However, in order to turn the transistor 304 off, at least one of the drivers must first of all remove the worst case current which is normally supplied from the generator 1-3 by way of the resistor 306 and the diode 305 to the transistor. At the same time, the driver must ensure that the input voltage developed at its input terminal 3-4, 3-5 or 3-6 is not required to go more negative than plus three-tenths volt in order to turn the transistor 304 off.

In a good circuit 300-1, the diodes and the base-emitter junction of the transistor 304 have low impedance forward voltage drops of approximately seven-tenths volt. The transistor 304 will be off when its base-emitter voltage is plus three-tenths volt, and a voltage at the junction between the input diodes and diode 305 of plus one volt will guarantee the turn-off of the transistor. With this condition, a portion of the current supplied from the generator 1-3 by way of the resistor 306 will flow through the diode 305 and the resistor 307 to the generator 1-7.

The remaining current from the positive six-volt supply must be removed by way of one of the input diodes in order to turn the transistor 304 off. Since it is assumed that the input diode in its conducting state has a seven-tenths volt drop and that the junction between the input diode and the diode 305 should be no more positive than plus one volt to turn the transistor 304 off, the input voltage to the conducting diode should not need to be more negtive than plus three-tenths volt to assure turn-off of the transistor 304.

Selection of the value of current to be removed from the input of circuit 300-1 to turn the transistor off will now be described.

Let it be assumed that the transistor 304 is rated to have a maximum collector current in saturation of thirty milliamperes and that the minimum beta for the transistor is equal to thirty. With a base-emitter voltage difference of plus three-tenths volt, the transistor is off and the collector leakage current should be in the order of five microamperes or less. With the gain and collector current selected above, the base-emitter voltage, when the base current is equal to one milliampere, should be equal to or less than seven-tenths volt.

Typical diodes will have a nominal current rating of one milliampere when the forward voltage drop across the diode is equal to seven-tenths volt and will have a nominal current of approximately ten microamperes when the forward drop across the diode is four-tenths volt. It is assumed therefore, that the reverse leakage current of the diode is equal approximately to zero.

With all drivers 1-4 to 1-6 switched to their most positive state (e.g. plus one volt) all three input diodes 301, 302 and 303 will be nonconducting if the circuit 300-1 is acceptable. Resistors 306 and 307 and the diode 305 form a voltage divider which assures the availability of one milliampere of current at plus seven-tenths volt for the base electrode of the transistor 304. Assuming that the transistor 304 is acceptable, it will turn on to saturation with a one milliampere input current. The base electrode of the transistor 304 will be at plus seven-tenths volt, the anode of the diode 305 will be at plus one and four-tenths volt and the voltage at the input terminals 3-4, 3-5 and 3-6 is at plus one volt or more positive to assure reverse biasing of the diodes 301 to 303.

In its simplest form, the load circuit 1-2 can be programmed to supply the desired load current to the saturated transistor 304 by way of the programmed current source including the common base amplifier 247. When the transistor 304 is turned off, the diode 245 becomes reverse biased and the emitter follower 241 supplies current to the common base amplifier. The voltage at the base electrode is programmed so that it produces at the anode of the diode 242 a voltage which lies between the most positive and least positive levels expected at the output terminal 3-2 of the card under test. Preferably, it produces a voltage at said anode which is approximately plus six and forty-five hundredths volts when the most positive level at the terminal 3-2 should not fall below five and ninety-five hundredths volts with the transistor 304 turned off.

When the programmed current from the load is supplied to the transistor 304 at saturation, the maximum collector voltage should not exceed three-tenths volt; otherwise a failure is detected.

Detection of various failure conditions in the circuit 300-1 will now be described.

If one or more input diodes are short-circuited or if they exhibit a low impedance characteristic at too low a bias voltage, the transistor 304 will not turn on with logical "1" levels at the inputs. Using the nominal values we have chosen for the low impedance voltage drops of the diodes and the base-emitter junction of the transistor 304, the junction between the input diodes and diode 305 must rise to a voltage of at least plus one and four-tenths volt to turn on the transistor. To achieve this, all three inputs are set to be a worst case logical "1" (e.g. plus one volt). This is done in order to have all three input diodes in their high impedance states.

If the input diode 303 is shorted or is a low impedance under these conditions, the junction will increase to a voltage slightly in excess of one volt. The common base current supply 216 in the driver 1–6 will begin to remove current from the junction; an increase of a few millivolts (approximately twenty) over plus one volt at the junction is sufficient to cause the above current to be drawn. Consequently, the junction cannot rise to plus one and four-tenths volt; and the transistor 304 will fail to turn on.

If one of the input diodes, e.g. 303, is open-circuited or has too high an impedance at seven-tenths volt forward bias, then the transistor 304 will be erroneously maintained on when a logical "0" (plus three-tenths volt) is applied to the diode 303 and a logical "1" (plus one volt) is applied to the diodes 301 and 302. With this condition the driver 1–6 cannot remove sufficient current from the junction between the diodes 303 and 305 and it cannot lower the voltage at this junction to a value low enough to turn off the transistor 304.

If the diode 305 is open-circuited or has too high a forward bias voltage drop compared with those of the input diodes, the transistor 304 will fail to turn on when positive one-volt potentials are applied to the input diodes. The junction between the input diodes and diode 305 may rise somewhat above plus one and four-tenths volts; however, the base voltage of the transistor will be lower than seven-tenths volt due to the large drop across the diode 305. Also, the drivers will begin to remove current from the junction.

If the forward drop across the diode 305 is too low, then the transistor 304 will not turn off when logical "0" positive three-tenths-volt potentials are applied to the input diodes. The input diodes will conduct causing a plus one-volt potential at their anodes. If the voltage drop across the diode 305 is in the order of three-tenths volt or less, the transistor 304 stays on.

If the value of the resistor 306 is too high, the transistor 304 will fail to turn on to its region of saturation when logical "1's" are applied to the input terminals 3–4 to 3–6. The resistor 306 will limit the current to a value at which the base current of the transistor is insufficient to cause saturation. An open-circuited resistor 306 reduces the base current to zero.

If the resistor 306 is short-circuited or too low in value, the transistor 304 will fail to turn off when logical "0" inputs are applied. The voltage at the junction between the input diodes and the diode 305 will remain at plus one and four-tenths volts (due to the clamping action of the diode 305 and the base-emitter junction) even though the drivers 1–4 to 1–6 provide voltage levels of plus three-tenths volt. The emitter followers such as 201 and the diodes such as 206 become reverse biased and the diodes 301 to 303 become forward biased. A catastrophic failure with the resistor 306 short-circuited is prevented by the design of the power supply circuits, such as 20 and 21 of test condition generator 1–1.

If the resistor 307 is short-circuited or too low in value, the base electrode of the transistor 304 cannot have a sufficiently positive voltage to turn on when logical "1" signals are applied to the input terminals 3–4 to 3–6.

If the resistor 307 is open-circuited or too high in value, the transistor will not turn off when logical "0" signals are applied to one or more of the input terminals 3–4 to 3–6. The value of the substantially constant bias current through the resistors 306 and 307 will be lower, and the voltages at both electrodes of the diode 305 will be more positive than they should be. Assuming that these voltages are plus seven-tenths and plus one and four-tenths volts, then the transistor 304 remains on, the diodes 301 to 303 are forward biased and the driver emitter followers such as 201 are reverse biased.

A defective transistor will be detected by its failure to turn on or off when it should in response to selected logical input conditions. For example, if the voltage at the anode of the diode 305 should attempt to go more positive than one plus four volts as a result of the transistor 304 not turning on to saturation with a seven-tenths base-to-emitter voltage, the input diodes 301 to 303 would begin to enter their low impedance regions causing current to flow into the driver circuits 1–4, 1–5 and 1–6. This current would be removed from the base of the transistor 304 to aid in preventing turn-on of the transistor.

In the event that it is desired merely to determine the acceptability or failure of a card, then checking the output voltage at terminal 3–2 is sufficient. If analysis of the circuit 300–1 to determine the defective component is desired, various readily apparent routines can be utilized by the CPU.

For example, if the diode 303 is open-circuited, the circuit fails when a logical "0" is applied to it and a logical "1" is applied to diodes 301 and 302. However, it does not fail if a logical "0" is applied to one of the diodes 301 or 302 while a logical "1" is applied to the other diode 301 or 302 and to diode 303. Thus three tests can be made by the CPU to identify the defective diode.

Examination of the conditions existing at the outputs of the drivers 1–4 to 1–6 can frequently be used to analyze the source of trouble. For example, as indicated above, an open-circuited resistor 307 fails to turn off the transistor 304 when one or more logical "0's" are applied to the inputs by the drivers 1–4 to 1–6. In addition, a more positive voltage (e.g. plus seven-tenths volt) appears at the output of any driver programmed for a logical "0" output condition.

From the above example, it can be seen that the same circuit can be used for both drive or load functions. The circuit configuration for the driver and for the load condition are generally similar except that a diode such as 245 is utilized in the load environment. The programming and the mode of operation, however, are different.

The driver is used to drive inputs of the card under test. The output of the driver is initially set up to switch between two discrete voltage levels. The constant current generator of the driver is programmed to remove the worst case current from the circuit under test. The discrete voltage levels which are required of each driver and the worst case current which is required are functions of the particular circuit which is being tested.

The load usually need not be switched between two voltage levels. The load current is programmed and a compliance voltage level is programmed to control the forward and reverse biasing of the output diode such as 245.

In some instances, for example, when testing A-C triggers, the driver is used to drive an input to the device under test which requires a fast transition time. In these cases, sufficient current is programmed for the current source in the driver to ensure fast positive and negative excursions to switch the device under test. When used in this way, usually one-half of the available current is programmed.

Figure 8:
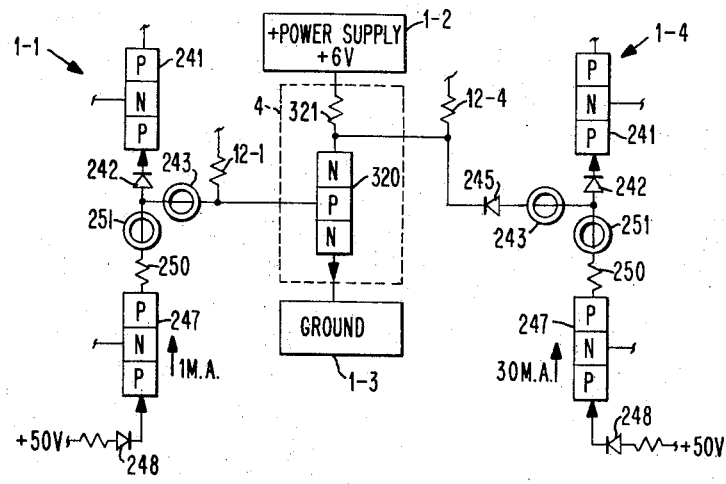

FIG. 8 illustrates the testing of a transistor 320 and its collector resistor 321 on a card 4. Reference numerals for illustrated components of the driver and load condition generators 1–1 and 1–3 are the same as those given corresponding components in FIGS. 5a and 5b.

Circuit specifications can be as follows: maximum collector current at saturation equals thirty-three milliamperes, beta equals thirty-three, collector-emitter saturation voltage is equal to or less than three-tenths volt and base-emitter voltage is equal to or less than six-tenths volt at a collector current of thirty-three milliamperes and a base current of one milliampere, and the minimum collector-emitter voltage is five and ninety-five hundredths volts at a base-emitter voltage of three-tenths volt. The resistor 321 has a value of two kilohms.

When the transistor 320 is turned on, approximately three milliamperes of current flow through the resistor 321. The remainder of the required collector saturation current (thirty milliamperes) must, therefore, be provided by the programmed load 1–4.

The current source of the driver 1–1 is programmed to supply a one milliampere bias current to the transistor 320. The driver is also programmed so that the emitter follower 241 applies alternatively a logical "1" signal of close to six-tenths volt or a logical "0" signal of three-tenths volt to the base electrode of the transistor 320. When the logical "0" signal is applied, the emitter follower 241 removes the one milliampere of bias current from the amplifier 247. When the logical "1" signal is applied, the one milliampere of bias current is supplied to the base electrode of the transistor 320. If the transistor 320 accepts the one milliampere of current at six-tenths volt, the transistor saturates to indicate a good transistor. If the transistor 320 requires a higher base-emitter drop to saturate, the emitter follower 241 begins to drain off a part of the one milliampere bias current; and the transistor 320 fails to saturate.

The voltage at the collector electrode of the transistor 320 is compared in the CPU with stored specification data at both logical input levels to determine the acceptance or failure of the card 4.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In electrical test apparatus of the type in which a test receptacle is adapted to receive supporting structures having electrical circuits thereon which are to be tested, in which the supporting structures include a plurality of contacts, each of which is adapted for connection with a specific external electrical condition when the circuit is connected for use within its intended environment, and in which the test receptacle includes an output terminal for each contact for coupling its respective contact to an electrical condition corresponding to that which would be applied when the circuit is connected for operation in its intended environment, said apparatus characterized by:
   a plurality of substantially identical multi-function test condition generating circuits, each of which corresponds to one of the receptacle terminals and each of which includes a controllable variable-voltage-producing circuit having a power supply physically remote from the test receptacle and having an output circuit immediately adjacent the test receptacle;
   means for coupling the output circuit to its respective receptacle terminal; and
   programmed control means coupled to each variable-voltage-producing circuit to selecitvely produce in each output circuit a predetermined one of a plurality of available test conditions so as to apply to the circuit under test at least certain of the conditions which are required for its operation within its intended environment, whereby the variable-voltage-producing circuits and the proximity of their output circuits to the test receptacle permit high speed testing with minimum coupling means complexity.

2. In electrical test apparatus of the type in which a test receptacle is adapted to receive supporting structures having electrical circuits thereon which are to be tested, in which the supporting structures include a plurality of contacts, each of which is adapted for connection with a specific external electrical condition when the circuit is connected for use within its intended environment, and in which the test receptacle includes an output terminal for each contact for coupling its respective contact to an electrical condition corresponding to that which would be applied when the circuit is connected for operation in its intended environment, said apparatus characterized by:
   a plurality of similar multi-function test condition generating circuits, each of which corresponds to one of the receptacle terminals; and
   programmed control means for causing each of the test condition generating circuits to produce at its output a predetermined one of a plurality of available test conditions so as to apply to the circuit under test all of the conditions which are required for its operation within its intended environment;
   each of the multi-function test condition generating circuits including
   first and second power supplies, each having an output terminal,
   means responsive to the control means for causing the supplies to produce predetermined different voltage levels at the supply output terminals,
   first and second driver-load circuits, each having an input terminal and an output terminal,
   means responsive to the control means for selectively operating the latter circuits alternatively as drivers or load circuits,
   first switching means responsive to the control means for selectively coupling the input terminals of the driver load circuits alternatively to the output terminal of the first or second power supply to produce at the circuit output terminals voltage levels which are a function of the supply output levels; and
   second switching means selectively operated by the control means to couple the output contact of the generator to a selected one of the supply or driver-load output terminals, thereby producing a desired test condition corresponding to one or another power supply level, a driver signal at one or another voltage level, or a load current at a desired voltage level.

3. The apparatus of claim 2 wherein each power supply comprises
   a power source having a pair of terminals at two different voltage levels,
   first means, including a cascade-connected operational amplifier and current amplifier with feedback from the current amplifier output to the operational amplifier input, connected to the source terminals for producing at the output of the current amplifier a voltage level intermediate said supply levels; and
   second means including a current summing circuit connected to the input of the operational amplifier and selectively controlled by the control means for determining the value of said intermediate voltage level.

4. The test apparatus of claim 3 wherein each driver-load circuit comprises
   cascade-connected emitter followers of opposite conductivity type having an input adapted to be coupled to the output of the current amplifier and having an output; and
   a current source including
   a common base amplifier having its output coupled to the emitter follower output and poled for series current flow through the emitter follower and common base amplifier; and
   means selectively controlled by the control means for causing a fixed current of preselected value to flow through the common base amplifier.

5. The test apparatus of claim 4 wherein the first switching means comprises
   a high speed hybrid latch including
   a transistor switch having a base electrode and having its collector and emitter electrodes coupled to the first and second power supply output terminals, respectively, and the collector electrode being further coupled to the inputs of the cascade-connected emitter followers,
   a tunnel diode connected across the base-emitter electrodes of the transistor switch to cause turn-on and turn-off of the switch in the high and low voltage states of the diode; and means responsive to the control means for switching the diode between its high and low voltage states.

6. A universal test condition generator for test apparatus comprising a power supply having a pair of terminals at two different voltage levels, first means, including a cascade-connected operational amplifier and current amplifier with feedback from the current amplifier output to the operational amplifier input, connected to the supply terminals for producing at the output of the current amplifier a voltage level intermediate said supply levels, second means including a selectively controlled current summing circuit connected to the input of the operational amplifier for determining the value of said intermediate voltage level, third means coupled to the current amplifier output for producing at its output a driver test condition substantially at the intermediate supply level, said third means including cascade-connected emitter followers of opposite conductivity type and a selectively controlled current source in series with the output of the emitter followers, said current source comprising a common base amplifier having its output coupled to the output of the emitter followers and a selectively controlled source of current coupled to the input of the common base amplifier for causing a fixed current of preselected value to flow through the common base amplifier, a generator output terminal, selectively operable switching means for alternatively coupling the current amplifier output directly to the generator output terminal to provide a selected power supply condition or coupling the output of the third means to the generator output terminal to provide a selected driver condition.

7. The combination set forth in claim 6 wherein the third means is selectively controlled to produce at its output alternatively a drive or a load test condition.

8. In test apparatus, a multi-function electrical test condition generator having an output contact and comprising first and second power supplies, each having an output terminal, each power supply comprising a power source having a pair of terminals at two different voltage levels, first means including a cascade-connected operational amplifier and current amplifier with feedback from the current amplifier output to the operational amplifier input connected to the source terminals for producing at the output of the current amplifier a voltage level intermediate said supply levels, and second means including a selectively-controlled current summing circuit connected to the input of the operational amplifiers for determining the value of said intermediate voltage level, means for controlling the supplies to product predetermined different voltage levels at the output terminals, first and second driver-load circuits each having an input terminal and an output terminal, each driver-load circuit comprising cascade-connected emitter followers of opposite conductivity type having an input adapted to be coupled to the output of the current amplifier and having an output, and a current source including a common base amplifier having its output coupled to the emitter follower output and poled for series current flow through the emitter follower and common base amplifier, and a selectively controlled means causing a fixed current of preselected value to flow through the common base amplifier, means for selectively operating the latter circuits alternatively as a driver or a load circuit, first switching means for selectively coupling the input terminals of the driver-load circuits alternatively to the output terminal of the first or second power supply to produce at the circuit output terminals voltage levels which are a function of the supply output levels, second switching means selectively operated to couple the output contact of the generator to one of the output terminals, thereby producing a desired test condition corresponding to one or another power supply level, a driver signal at one or another voltage level, or a load current at a desired voltage level.

9. The generator of claim 8 wherein the first switching means comprises a high speed hybrid latch including a transistor switch having a base electrode and having its collector and emitter electrodes coupled to the first and second power supply output terminals, respectively, and the collector electrode being further coupled to the inputs of the cascade-connected emitter followers, a tunnel diode connected across the base-emitter electrodes of the transistor switch to cause turn-on and turn-off of the switch in the high and low voltage states of the diode; and means for switching the diode between its high and low voltage states.

10. In electrical test apparatus of the type in which a test receptacle is adapted to receive supporting structures having electrical circuits thereon which are to be tested, in which the supporting structures include a plurality of contacts, each of which is adapted for connection with a specific external electrical condition when the circuit is connected for use within its intended environment, and in which the test receptacle includes an output terminal for each contact for coupling its respective contact to an electrical condition corresponding to that which would be applied when the circuit is connected for operation in its intended environment, said apparatus characterized by:

a plurality of substantially identical multifunction test condition generating circuits, each of which corresponds to one of the receptacle terminals;

each multi-function test condition generating circuit including a controllable variable-voltage-producing circuit having a power supply physically remote from the test receptacle and having an output circuit with an output terminal immediately adjacent the test receptacle, a driver-load circuit immediately adjacent the test receptacle and having an input terminal and an output terminal, and means for coupling the input terminal of the driver-load circuit to the output terminal of the variable-voltage-producing circuit;

means for coupling the output terminal of each driver-load circuit to a respective receptacle terminal; and programmed control means causing each variable-voltage-producing circuit to produce at its output terminal a predetermined one of a plurality of available voltage levels and for causing each driver-load circuit to function alternatively as a driver or load so as to apply, to the circuit under test, conditions which are required for its operation within its intended environment, whereby high speed testing is achieved with minimum coupling means complexity.

11. The electrical test apparatus set forth in claim 10 further comprising switch means for coupling alternatively the output terminal of the variable-voltage-producing circuit or the driver-load circuit of each test condition generating circuit to its respective receptacle terminal, whereby each multi-function test condition generating circuit is programmed to act alternatively as a power supply, a driver, or a load.

References Cited

UNITED STATES PATENTS

| | | | |
|---|---|---|---|
| 3,237,100 | 2/1966 | Chalfin | 324—73 |
| 3,286,175 | 11/1966 | Gerbier | 324—73 |
| 3,409,828 | 11/1968 | Kelsey | 324—73 |

WILLIAM F. LINDQUIST, Primary Examiner

E. L. STOLARUN, Assistant Examiner

U.S. Cl. X.R.

307—38; 324—158